3,677,804
MOLDABLE NEEDLE-LIKE ASSEMBLIES

Ilmar L. Kalnin, Millington, and George J. Breckenridge, Roselle, N.J., assignors to Celanese Corporation, New York, N.Y.
No Drawing. Filed Sept. 19, 1969, Ser. No. 859,458
Int. Cl. B44d 1/20
U.S. Cl. 117—100 A         13 Claims

ABSTRACT OF THE DISCLOSURE

Moldable epoxy resin impregnated fibrous needle-like assemblies are provided which may be utilized in the production of fiber reinforced composites. The needle-like assemblies are formed by agitating at an elevated temperature a minor quantity of discontinuous fibers with an emulsion comprising a minor quantity of an A-stage epoxy resin and a curing agent for said epoxy resin within a major quantity of a continuous phase comprising a mixture of glycerol, water, and a water-soluble nonionic surface-active agent. The product of the present invention is recovered from the system in which is formed and is suitable for use as a granular moldable material which consists of essentially unidirectionally aligned fibers impregnated with a B-stage epoxy resin.

BACKGROUND OF THE INVENTION

In recent years increasing interest has been focused upon fiber reinforced composite materials and their production. Such interest has been intensified by the growing requirements of the aerospace industry for high performance composites. For instance, it is generally recognized that fiber reinforced composites may be selected for use as high strength structural components while possessing only a fraction of the weight of more conventional materials commonly employed in the same or similar applications.

Fiber reinforced composites of the highest tensile strengths and moduli are commonly produced (1) by the winding of continuous lengths of resin impregnated yarns or rovings or (2) by mechanical or hand layup of resin impregnated fiborus materials. Such production techniques while producing outstanding products have generally proven to be highly time consuming and tedious. There has accordingly remained a need for composite fabrication methods capable of offering faster production rates, particularly when forming fiber reinforced composites which are not required to exhibit the maximum attainable tensile strengths and moduli.

It is an object of the present invention to provide a granular epoxy resin impregnated moldable material suitable for use in the production of fiber reinforced composites.

It is an object of the invention to provide an efficient process for the formation of discrete moldable needle-like assemblies consisting of essentially unidirectionally aligned fibers impregnated with a B-stage epoxy resin.

It is an object of the invention to provide moldable needle-like assemblies which are amenable to rapid composite fabrication techniques, e.g. extrusion.

It is another object of the invention to provide moldable needle-like assemblies which possess a propensity for self-alignment within a mold.

It is a further object of the invention to provide moldable needle-like assemblies which may utilize readily available discontinuous lengths of fibrous materials as the reinforcing component.

These and other objects, as well as the scope, nature, and utilization of the invention will be apparent to those skilled in the art from the following detailed description and appended claims.

SUMMARY OF THE INVENTION

It has been found that a process for the production of moldable epoxy resin impregnated fiborous needle-like assemblies comprises:

(a) providing a minor quantity of an A-stage epoxy resin and a curing agent for the epoxy resin emulsified within a major quantity of a continuous phase comprising a mixture of glycerol, water, and a water-soluble nonionic surface-active agent,
(b) introducing with agitation a minor quantity of discontinuous fibers into the emulsion,
(c) agitating the emulsion containing the fibers at an elevated temperature whereby a plurality of discrete needle-like assemblies are formed consisting of essentially unidirectionally aligned fibers impregnated with the A-stage epoxy resin,
(d) heating the resulting needle-like assemblies at an elevated temperature until the epoxy resin component thereof is converted to a B-stage epoxy resin,
(e) and recovering the resulting moldable needle-like assemblies.

The product formed in the present invention may be molded to form a fiber reinforced structural component.

DETAILED DESCRIPTION OF THE INVENTION

The continuous phase

The continuous phase of the emulsion utilized in the present invention is a non-solvent for the A-stage epoxy resin and its curing agent and comprises a mixture of glycerol (1,2,3-propanetriol), water, and a water-soluble nonionic surface-active agent. The continuous phase may comprise about 50 to 95 percent water by weight, about 4 to 40 percent glycerol by weight, and about 1 to 15 percent of a water-soluble nonionic surface-active agent by weight each based upon the total weight of the continuous phase.

In a preferred embodiment of the invention the continuous phase comprises about 80 to 93 percent water by weight, about 5 to 15 percent glycerol by weight, and about 2 to 8 percent of a water-soluble nonionic surface-active agent by weight each based upon the total weight of the continuous phase.

It is essential that the surface-active agent utilized in the continuous phase of the emulsion be nonionic and water-soluble. As is known in the art, the nonionic surface-active agents do not ionize but acquire hydrophilic character from an oxygenated sidechain, usually polyoxyethylene. The oil-soluble part of the molecule may come from fatty acids, phenols, alcohols, amides or amines. Representative nonionic surface-active agents include alkylphenoxypoly(oxyethylene)ethanols arising from the combination of an alkylphenol with ethylene oxide. For instance, such water-soluble nonionic surface-active agents may have the general formula:

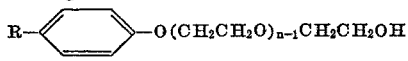

where R is an alkyl radical having 5 to 10 carbon atoms and $n$ is the number of moles of ethylene oxide commonly about 2 to 10. Other representative nonionic surface-active agents include the condensation products of ethylene oxide with a hydrophobic base formed by the condensation of propylene oxide with propylene glycol with the resulting nonionic surfactant having a molecular weight of about 1000 to 15,000 or more. Additional nonionic water-soluble surface-active agents having a substantially comparable hydrophobic-hydrophilic character may be conveniently selected for use in the process as will be apparent to those skilled in the art.

Suitable nonionic surface-active agents for use in the present invention by their standard trade designations: Igepal CO–630 (General Aniline & Film Corporation), Pluronic F–68 (Wyandotte Chemicals Corp.), Ep-Aqua (R. T. Vanderbilt Co.).

The epoxy resin system

The discontinuous phase of the emulsion comprises an A-stage epoxy resin and a curing agent for the epoxy resin emulsified within the continuous phase heretofore described. The discontinuous phase is a flowable liquid and the epoxy resin component thereof is essentially uncured, i.e. an A-stage epoxy resin. When exposed to heat for an extended period of time the epoxy resin will harden or set to a rigid solid consistency designated as a C-stage epoxy resin, and may not subsequently be rendered plastic or flowable upon the reapplication of heat. The curing or hardening of the epoxy resin is brought about by heat promoted chemical changes which result in the formation of a progressively more rigid-cross-linked system. The term B-stage epoxy resin as used herein is defined as a partially cured epoxy resin which has neither the consistency of a flowable liquid, nor the consistency or a rigid solid. A B-stage epoxy resin is accordingly soft and tacky in its consistency and may be readily shaped or molded. Upon the passage of time even at room temperature, a B-stage thermosetting resin will assume a C-stage consistency. This conversion from a B-stage consistency to a completely gelled C-stage consistency is substantially accelerated or advanced by heat.

The uncured epoxy resin selected for use in the present invention is inherently liquid at about room temperature or may be modified to possess flowable properties at about room temperature by the addition of conventional modifiers or diluents. Numerous modifiers, diluents, or flexibilizers of both the reactive and non-reactive types are well known and include butyl glycidyl ether, higher molecular weight glycidyl ethers or mixtures thereof, and furfuryl alcohol. When epoxy resin modifiers or diluents of the reactive type are utilized, the weight of the simple epoxy resin plus the weight of the chemically combined reactive diluent or modifier is considered the weight of the epoxy resin.

The epoxy resins utilized in the present invention are most commonly prepared by the condensation of bisphenol A (4,4' isopropylidene diphenol) and epichlorohydrin. Also, other polyols, such as aliphatic glycols and novolac resins may be reacted with epichlorohydrin for the production of epoxy resins suitable for use in the instant process provided resins are selected which possess the requisite flow properties.

In a preferred embodiment of the invention epoxy resins are selected which possess terminal epoxide groups and are condensation products of bisphenol A and epichlorohydrin of the following formula:

where $n$ varies between zero and a small number of less than about 10. When $n$ is zero, the resin is a very fluid light-colored material which is essentially the diglycidyl ether of bisphenol A. As the molecular weight increases so generally does the viscosity of the resins. Accordingly, the particularly preferred liquid epoxy resins generally possess an $n$ value averaging less than about 1.0.

Illustrative examples by standard trade designations of various particularly useful commercially available epoxy resins include: Epi-Rez 508, Epi-Rez 510, and Epi-Rez 5155 (Celanese Coatings Company); DER 332, and DEN 438 (Dow Chemical Company); Epon 828, and Epon 1031 (Shell Chemical Company); and ERLA 2256 (Union Carbide).

A variety of epoxy resin curing agents may be used in the process of the present invention and are provided in a quantity sufficient to completely harden the epoxy resin component. The curing or hardening of the epoxy resin typically involves further reaction of the epoxy or hydroxyl groups to cause molecular chain growth and cross-linking. The term "curing agent" as used herein is accordingly defined to include the various hardeners of the co-reactant type. Illustrative classes of known epoxy curing agents which may be utilized in the process include aliphatic and aromatic amines, polyamides, tertiary amines, amine adducts, acid anhydrides, acids, aldehyde condensation products, and Lewis acid type catalysts, such as boron trifluoride. The preferred epoxy curing agents for use in the process are methylbicyclo[2.2.1] heptene-2,3-dicarboxylic anhydride isomers marketed under the designation Nadic Methyl Anhydride (Allied Chemical Co.); 2-ethyl, 4-methyl imidazole marketed under the designation of EMI-24 (Air Products and Chemicals, Inc.); and aromatic amines (e.g. meta phenylene diamine and dimethylaniline) marketed under the designation Epi-Cure 841 (Celanese Coatings Company). The particularly preferred epoxy curing agents for use in the process are the aromatic amines.

The reinforcing fibers

The reinforcing fibers are provided as discontinuous lengths and may be of varied composition. The fibers may range from about ⅛ to 2 inches in length, and preferably have a length of about ¼ to ¾ inch.

Illustrative examples of suitable fibers include carbonaceous fibers, glass fibers, asbestos fibers, boron fibers, alumino silicate fibers, sapphire fibers, silicon carbide fibers, or whiskers of the above-mentioned materials, and high tenacity organic fibers, e.g. highly oriented regenerated cellulose fibers sold under the designation Fortisan by the Celanese Corporation, etc. Fiber mixtures may be selected. Also, it is highly desirable that the fibrous reinforcing medium selected be capable of forming an adherent bond with the epoxy resin and for this purpose it may be opitonally coated or surface treated by conventional techniques prior to its utilization.

In a preferred embodiment of the process, the fibers are carbonaceous in nature (i.e. contain at least about 90 percent carbon by weight). In a particularly preferred embodiment of the invention, the fibrous material is formed primarily of graphitic carbon which may be detected by the characteristic X-ray diffraction pattern of graphite. Carbonaceous fibers may be formed in accordance with the teachings of U.S. Ser. No. 777,275, filed Nov. 20, 1968 of Charles M. Clarke, which is assigned to the same assignee as the instant invention and is herein incorporated by reference. Carbonaceous fibers formed by other techniques may also be selected for use in the present process.

The fibers utilized in the present process may be optionally selected from readily available waste materials re-

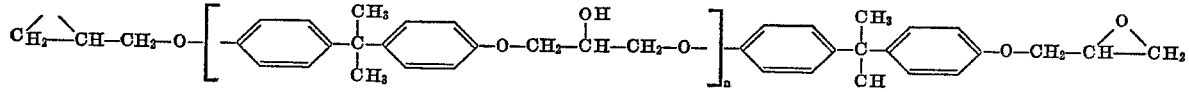

sulting from graphite yarn production (e.g. at the startup of a run). If necessary, continuous or relatively long lengths of fibrous materials, e.g. filaments, yarns, rovings, etc., may be chopped to the relatively short fiber lengths required to form the moldable epoxy resin impregnated needle-like assemblies.

Formation of needle-like assemblies

A minor quantity of the A-stage epoxy resin and a curing agent for the epoxy resin is emulsified within a major quantity of a continuous phase comprising a mixture of glycerol, water, and a water-soluble non-ionic surface-active agent. For instance, about 0.5 to 25 parts by weight of the epoxy resin and curing agent for the same may be provided per 100 parts by weight of the continuous phase. In a preferred embodiment of the invention about 1 to 5 parts by weight of the epoxy resin and curing agent are provided per 100 parts by weight of the continuous phase. The emulsion may be formed by agitating the components of the same under high shear conditions, such as produced by a Waring Blendor or other high shear stirrer. Ultrasonics optionally may be used to produce the agitation required for emulsion formation. The components utilized to form the emulsion are preferably at about 20 to 60° C. when agitated. In a particularly preferred embodiment of the invention the emulsion components are at about room temperature (e.g. 25° C.) when emulsified.

While the emulsion is agitated or stirred under relatively low shear conditions, a minor quantity of the discontinuous fibers is introduced into the same. The fibers are preferably added in a concentration of about 5 to 60 parts by weight per 100 parts by weight of the epoxy resin and curing agent. In a particularly preferred embodiment of the invention, the fibers are added in a concentration of about 10 to 30 parts by weight per 100 parts of the epoxy resin and curing agent. The emulsion is preferably at a temperature of about 50 to 70° C. when the fibers are added.

The emulsion containing the discontinuous fibers is next agitated under relatively low shear conditions at an elevated temperature such as by the use of a central stirrer whereby a plurality of discrete needle-like assemblies are formed consisting of essentially unidirectionally aligned fibers impregnated with the A-stage epoxy resin as well as a curing agent for the same. Any convenient stirring procedure may be selected which is capable of suspending the fibers in the emulsion. The fibers which are initially suspended in the emulsion in a random fashion become uniaxially aligned within each needle-like assembly as it forms. The glycerol component of the emulsion has surprisingly been found capable of preventing the formation of extremely large clumps or bundles of the fibers which may be less oriented and excessively resin rich, and enables the production of the needle-like assemblies to take place on a reliable basis. The glycerol component accordingly makes possible the controlled orientation of the fibers into discrete essentially parallel fiber bundles of limited size which are impregnated with the A-stage epoxy resin and its curing agent. Commonly the needle-like assemblies are formed after about 5 to 15 minutes of agitation at a temperature of about 60 to 95° C., and preferably at a temperature of about 70 to 90° C.

While agitation of the needle-like assemblies continues at an elevated temperature they are advanced in situ to a moldable B-stage or "prepreg" consistency. For instance, the system may be agitated at a temperature of about 60 to 95° C. until the B-stage consistency is achieved. The exact time required to partially cure the epoxy resin is, of course, dependent to at least some degree upon the specific epoxy resin and curing agent selected as well as upon temperature. Commonly a B-stage consistency is achieved within about 15 minutes to 8 hours after the needle-like assemblies are formed.

Once the epoxy resin component of the needle-like assemblies is converted to a B-stage consistency, the moldable product is recovered from the system in which it was formed. The curing of the needles in situ is accordingly terminated prior to the advancement of the epoxy resin to a C-stage consistency. The system is preferably cooled to at least about 50° C. prior to the removal of the needle-like assemblies from the emulsion system. The product may be conveniently recovered by filtration through a screen having openings capable of retaining the same.

It is recommended that the epoxy resin impregnated needle-like assemblies next be washed to remove residual quantities of the emulsion system to the substantial exclusion of the advancement of the epoxy resin component thereof beyond a B-stage consistency. For instance, the product may be agitated with successive rinses of cool water followed by at least one rinse with a relatively highly volatile organic water-miscible wash medium such as methanol which is essentially a non-solvent for the epoxy resin component. Other satisfactory wash media include isopropanol, ethanol, and similar alcohols. During washing it is desirable that substantially all of the glycerol and the nonionic surface-active agent be removed from the needle-like assemblies particularly when it is desired to use the product in the formation of composites exhibiting optimum physical properties.

The wash medium may be removed through volatilization by placing the needle-like assemblies in a desiccator, freeze drying, or by heating the same in a vacuum oven at a relatively low temperature, e.g. below about 40° C.

The needle-like assemblies may be directly used in the formation of fiber reinforced composites or placed in storage for future use. For instance, the moldable B-stage product may be stored as long as 5 to 14 days at room temperature while retaining a B-stage consistency depending upon the specific epoxy resin composition. If stored under refrigeration (e.g. at about 0° C.), the needle-like assemblies possess a considerably longer shelf life (e.g. up to about 6 months or more).

To form fiber reinforced composites the needle-like assemblies may be extruded through the use of conventional molding equipment and subsequently cured to a C-stage consistency at an elevated temperature. Alternatively, the assemblies may be unidirectionally aligned in a suitable mold cavity, degassed, and subsequently compressed to form three dimensional molded articles at an elevated temperature. Additionally, the assemblies may be unidirectionally aligned and compressed at an elevated temperature to form continuous sheets, which are subsequently assembled in a multidirectional orientation and compressed with further curing. The needle-like assemblies may also be utilized in vacuum bag molding techniques. Since the fibers present within each needle-like assembly are substantially oriented, the performance of composites formed therefrom tends to be improved when compared to that of composites formed from molding compounds in which a fibrous component is randomly arranged.

The following examples are given as specific illustrations of the invention. It should be understood, however, that the invention is not limited to the specific details set forth in the examples.

EXAMPLE I

A solution is formed consisting of 25 parts by weight glycerol, 220 parts by weight deionized water, and 11 parts by weight of water-soluble nonionic surface-active agent formed by the combination of nonylphenol and ethyene oxide. The nonionic surface-active agent is available commercially under the designation Igepal CO-630 from the General Aniline and Film Corporation and consists of about 63 percent ethylene oxide by weight based upon the weight of nonylphenol.

Three parts by weight of a solventless resin system are prepared consisting of an A-stage epoxy resin formed by the condensation of bisphenol A and epichlorohydrin and a mixture of metaphenylene diamine and dimethylaniline as curing agents. The resin system contains the epoxy resin and curing agents in a weight proportion of 4:1. The epoxy resin is available commercially under the designation Epi-Rez 508 from the Celanese Coatings Company. The curing agent mixture is available commercially under the designation Epi-Cure 841 from the Celanese Coatings Company.

The aqueous solution including glycerol and nonionic surface-active agent together with the resin system is agitated while at room temperature in a Waring blendor at approximately 18,000 r.p.m. for approximately 1 minute to form an emulsion in which the aqueous solution forms the continuous phase. The resulting emulsion is transferred to a vessel provided with a central agitator and is stirred at 250 r.p.m. for approximately 5 minutes during which time its temperature is raised to 60° C.

While stirring continues, 0.5 part by weight carbon fibers having lengths of about 3/8 inch are added to emulsion. The temperature of the emulsion containing the fibers is next raised to 85° C. over a period of 15 minutes at which point the fibers aggregate into a plurality of needle-like assemblies of about 1/2 to 1 inch in length, and about 1/32 to 1/8 inch in thickness. Within each needle-like assembly approximately 500 to 1000 individual fibers are aligned essentially unidirectionally, and are impregnated with the A-stage epoxy resin and curing agent.

The epoxy resin component of the needle-like assemblies is next converted to a moldable B-stage consistency while continuing to agitate with rotational stirring and heat the same in situ at about 85° C. for an additional 15 minutes. The contents are cooled to 35° C. and the moldable needle-like assemblies are recovered by filtration. The product is next washed four times with pure water, and washed four times with methanol to remove essentially all of the glycerol and the nonionic surfactant. Drying the needle-like assemblies is conducted in a vacuum oven at about 40° C.

Composite test specimens are formed from the moldable needle-like assemblies by placing the same in bar mold to the desired level and pressing in a platen press at 50 p.s.i. for 2 hours at 80° C., followed by 4 hours at 160° C.

The composite bars typically exhibit the following physical properties: a fiber to resin volume ratio of 3:10, a flexural strength of 90,600 p.s.i., a short beam shear strength of 8,200 p.s.i., and a density of 1.36 grams per cubic centimeter. Similar composites are suitable for use as high strength engineering materials, aircraft parts, turbine blades, missile components, high speed tool components, or in other applications where a strong lightweight structural component is required.

EXAMPLE II

Example I is repeated with the exception that glass fibers are selected as the reinforcing medium instead of carbon fibers.

Although the invention has been described with preferred embodiments, it is to be understood that variations and modifications may be resorted to as will be apparent to those skilled in the art. Such modifications and variations are to be considered within the purview and scope of the claims appended hereto.

We claim:

1. A process for the production of moldable epoxy resin impregnated fibrous needle-like assemblies comprising:
    (a) providing a minor quantity of an A-stage epoxy resin and a curing agent for said epoxy resin emulsified within a major quantity of a continuous phase comprising a mixture of glycerol, water, and a water-soluble nonionic surface-active agent,
    (b) introducing with agitation a minor quantity of discontinuous fibers into said emulsion,
    (c) agitating said emulsion containing said fibers at an elevated temperature whereby a plurality of discrete needle-like assemblies are formed consisting of essentially unidirectionally aligned fibers impregnated with said A-stage epoxy resin,
    (d) heating said resulting needle-like assemblies at an elevated temperature until the epoxy resin component thereof is converted to a B-stage epoxy resin,
    (e) and recovering the resulting moldable needle-like assemblies.

2. A process according to claim 1 wherein said emulsion contains about 0.5 to 25 percent by weight of said A-stage epoxy resin and curing agent for said epoxy resin emulsified within said continuous phase based upon the total weight of the continuous phase.

3. A process according to claim 1 wherein said continuous phase of said emulsion comprises about 50 to 95 percent water by weight, about 4 to 40 percent glycerol by weight, and about 1 to 15 percent of a water-soluble nonionic surface-active agent by weight based upon the total weight of the continuous phase.

4. A process according to claim 1 wherein said discontinuous fibers are introduced in a quantity of about 5 to 60 percent by weight based upon the weight of said epoxy resin and curing agent.

5. A process according to claim 1 wherein said discontinuous fibers are about 1/8 to 2 inches in length.

6. A process according to claim 1 wherein said discrete needle-like assemblies are formed by agitating said emulsion in the presence of said discontinuous fibers at a temperature of about 60 to 95° C.

7. A process according to claim 1 wheerin said discontinuous fibers are carbonaceous.

8. A process according to claim 1 wherein said needle-like assemblies consisting of essentially unidirectionally aligned fibers impregnated with said A-stage epoxy resin are heated at a temperature of about 60 to 95° C. for about 15 minutes to 8 hours thereby converting said epoxy resin component to a B-stage epoxy resin.

9. A process according to claim 1 wherein the resulting moldable needle-like assemblies are recovered by filtration, washed, and dried.

10. The moldable needle-like assemblies formed in accordance with the process of claim 1.

11. A process for the production of moldable epoxy resin impregnated fibrous needle-like assemblies comprising:
    (a) providing about 1 to 5 percent by weight of an A-stage epoxy resin and a curing agent for said epoxy resin emulsified within a continuous phase based upon the total weight of the continuous phase, said continuous phase comprising about 80 to 93 percent water by weight, about 5 to 15 percent glycerol by weight, and about 2 to 8 percent of water-soluble nonionic surface-active agent by weight based upon the total weight of the continuous phase,
    (b) introducing with agitation into said emulsion about 10 to 30 percent by weight based upon the weight of said epoxy resin and curing agent of discontinuous fibers of about 1/4 to 3/4 inch in length,
    (c) agitating said emulsion containing said fibers at about 70 to 90° C. whereby a plurality of discrete needle-like assemblies are formed consisting of essentially unidirectionally aligned fibers impregnated with said A-stage epoxy resin,
    (d) heating said resulting needle-like assemblies at about 60 to 95° C. while present in said emulsion system for about 15 minutes to 8 hours until said epoxy resin component thereof is converted to a B-stage epoxy resin, and
    (e) recovering the resulting moldable needle-like assemblies.

12. A process according to claim 11 wherein said discontinuous fibers are carbonaceous.

13. A process according to claim 12 wherein said discontinuous carbonaceous fibers are composed primarily of graphitic carbon.

References Cited

UNITED STATES PATENTS

| | | | |
|---|---|---|---|
| 1,993,434 | 3/1935 | Champney | 117—100 |
| 2,972,552 | 2/1961 | Winter | 117—228 X |
| 2,981,334 | 4/1961 | Powell | 117—100 X |
| 3,239,403 | 3/1966 | Williams et al. | 117—228 X |
| 3,297,466 | 1/1967 | Herman et al. | 117—100 X |
| 3,305,498 | 2/1967 | Herman et al. | 117—100 X |
| 3,476,641 | 11/1969 | Milewski | 117—161 X |
| 3,480,471 | 11/1969 | Rembold | 117—161 |

FOREIGN PATENTS

| | | | |
|---|---|---|---|
| 791,598 | 4/1955 | Great Britain | 117—228 |
| 979,932 | 1/1965 | Great Britain | 117—100 |

M. R. PERRONE, JR., Assistant Examiner

U.S. Cl. X.R.

117—100 B, 100 S, 126 GE, 161 ZB, 228

PO-1050
(5/69)

Docket 4746

UNITED STATES PATENT OFFICE
CERTIFICATE OF CORRECTION

Patent No. 3,677,804  Dated July 18, 1972

Inventor(s) ILMAR L. KALNIN et al

It is certified that error appears in the above-identified patent and that said Letters Patent are hereby corrected as shown below:

In column 3, line 18, after "designations" insert --include--

In column 4, line 72, the structural formula reads:

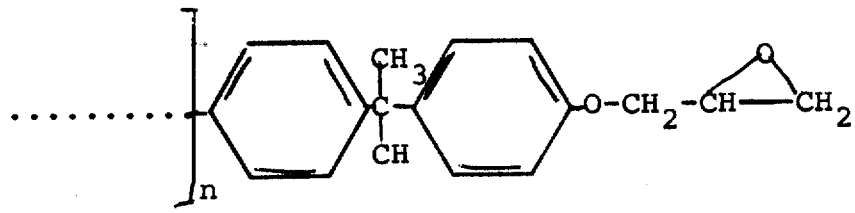

and should read:

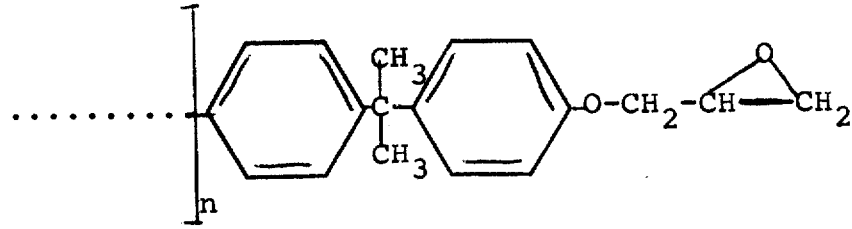

Signed and sealed this 2nd day of January 1973.

(SEAL)
Attest:

EDWARD M. FLETCHER, JR.
Attesting Officer

ROBERT GOTTSCHALK
Commissioner of Patents